United States Patent
Yumoto et al.

(10) Patent No.: US 7,663,285 B2
(45) Date of Patent: Feb. 16, 2010

(54) BRUSHLESS MOTOR

(75) Inventors: Tohru Yumoto, Kiryu (JP); Hisashi Ishida, Maebashi (JP); Susumu Miyazaki, Niiza (JP); Kazushi Hamaya, Iruma-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/264,639

(22) Filed: Nov. 4, 2008

(65) Prior Publication Data

US 2009/0127964 A1 May 21, 2009

(30) Foreign Application Priority Data

Nov. 5, 2007 (JP) .............................. 2007-287863

(51) Int. Cl.
*H02K 23/40* (2006.01)
(52) U.S. Cl. .............................. 310/194; 310/216.088; 310/71
(58) Field of Classification Search ............ 31/216.088, 31/216.004, 194, 71, 216–218
See application file for complete search history.

(56) References Cited

U.S. PATENT DOCUMENTS 6,194,806 B1 * 2/2001 Suzuki et al. ............... 310/269
6,595,760 B2 * 7/2003 Shida et al. ............... 417/410.1
7,569,965 B2 * 8/2009 Miyashita et al. ........... 310/194
2004/0245882 A1 * 12/2004 Horie et al. ................. 310/194
2004/0263015 A1 * 12/2004 Okada et al. ................ 310/194
2005/0099086 A1 * 5/2005 Schunk et al. .............. 310/216
2006/0071569 A1 * 4/2006 Stewart et al. .............. 310/194

FOREIGN PATENT DOCUMENTS

JP 2004-194458 A 7/2004

* cited by examiner

*Primary Examiner*—Quyen Leung
*Assistant Examiner*—Leda Pham
(74) *Attorney, Agent, or Firm*—Arent Fox LLP.

(57) ABSTRACT

This brushless motor according to the present invention is provided with: a tubular stator case; a stator core; a rotor; a plurality of teeth which are integrally formed on an inner peripheral surface of the stator core; a coil bobbin mounted between the mutually adjacent teeth, which has a winding portion around which a coil is wound; a lead wire; and a wiring substrate which relays a connection between the lead wire and the coil, wherein: the coil bobbin has flange portions; one of the flange portions which is located on the inward in the radial direction has an enlarged member which protrudes outward from the surface of the flange portion; a pair of terminals which is connected to the wiring substrate is provided on the enlarged portion so as to be located more inward than a tip of the tooth in the radial direction.

2 Claims, 3 Drawing Sheets

BRUSHLESS MOTOR

BACKGROUND OF THE INVENTION

Priority is claimed on Japanese Patent Application No. 2007-287863, filed on Nov. 5, 2007, the contents of which are incorporated herein by reference.

1. Field of the Invention

The present invention relates to an inner rotor type brushless motor which has, for example, a rotor and a stator.

2. Description of the Related Art

Generally, an inner rotor type brushless motor has a stator core fitted into and fixed to a stator case, and a rotor rotatably provided with respect to the stator core, and includes permanent magnets at an outer peripheral portion thereof. This stator core includes a plurality of teeth which protrude radially inward. A coil bobbin around which a coil is wound is mounted on each of the teeth. As electric current flows into the coil, an attractive or repulsive force is generated between the rotor and the stator to rotate the rotor.

Among this type of coil bobbin, for example, there is one which is constituted by a connecting portion connecting an inner bobbin and an outer bobbin, and in which a coil is wound around the connecting portion (for example, refer to Japanese Unexamined Patent, First Application Publication No. 2004-194458). Further, an upper end of the inner bobbin is provided with a coil holding portion made of resin to which a coil starting portion of the coil is fixed, while an upper end of the outer bobbin is provided with a coil holding portion to which a winding finishing portion of the coil is fixed. After a plurality of coil bobbins is mounted on the stator core, the coil holding portion is joined to a through-hole of a substrate by soldering, and is electrically connected with lead wires drawn in from the outside.

However, in the above-mentioned brushless motor, the through-hole should be formed inside the substrate by a distance required for forming lands or patterns due to the lands or patterns being formed on the substrate. Along with this, the position of the coil holding portion to be inserted into the through-hole should be arranged more inward than necessary. That is, useless space may be created in a portion more radially outside than the through-hole, and accordingly, the wall thickness of the stator core should be made large. Thus, there is a problem in that a large winding space for the coil cannot be secured. As a result, since the occupancy of the coil decreases, an increase in loss and a decrease in motor torque may be caused. Further, in order to improve the occupancy of the coil, a motor should be made large.

SUMMARY OF THE INVENTION

Thus, the invention has been made in view of the above-described circumstances, and the object of the invention is to provide a brushless motor capable of improving motor torque at low cost while making an apparatus small.

In order to solve the above problems, the brushless motor according to the present invention is provided with: a tubular stator case; a stator core fitted into the stator case; a rotor rotatably supported via a bearing inside the stator core; a plurality of teeth which extend inward in radial directions of the stator core and are integrally formed on an inner peripheral surface of the stator core at regular intervals in the peripheral direction of the stator core; a coil bobbin mounted between the mutually adjacent teeth, which has a winding portion around which a coil is wound; a lead wire which feeds power to the coil; and a wiring substrate which relays a connection between the lead wire and the coil, wherein: the coil bobbin has flange portions which protrude outward from peripheral edges of the both ends of the coil bobbin; one of the flange portions which is located on the inward in the radial direction has an enlarged member which protrudes outward from the surface of the flange portion; a pair of terminals which is connected to the wiring substrate is provided on the enlarged portion so as to be located more inward than a tip of the tooth in the radial direction.

In this case, since the pair of terminals are disposed more inward than the tip of the tooth on the inner diameter side of the stator core, the through-hole of the wiring substrate can be formed inside. That is, the wall thickness of the yoke portion can be made small by using the space formed on the internal diameter side of the stator core. Therefore, the space of the slot formed between the adjacent commutating-pole teeth can be largely secured. Accordingly, since the occupancy of the coil can be improved, loss can be reduced, and motor torque can be enhanced. Further, it is possible to make an apparatus small and lightweight while securing the space factor of the coil.

It may be arranged such that the other of the flange portions which is located on the outward side in the radial direction has a holding portion which holds the coil wound to one end of the coil bobbin and guides the end of the coil to one of the terminals.

In this case, the holding portion is formed in the coil bobbin. Therefore, the winding finishing end of the coil wound around the winding portion is wound around the holding portion. Thereby, since the coil can be more firmly wound compared with a case where the winding finishing end of the coil is directly connected in the terminal, in addition to the above effects, loosening of the tension caused by temporal vibration, etc. can be prevented. Accordingly, since disordered winding of the coil can be prevented, the occupancy of the coil can be improved, loss can be reduced and short-circuiting between the coil and metal parts, such as the teeth, can be prevented.

DETAILED DESCRIPTION OF THE INVENTION

Next, an embodiment of the invention will be described with reference to the drawings.

Figure 1:
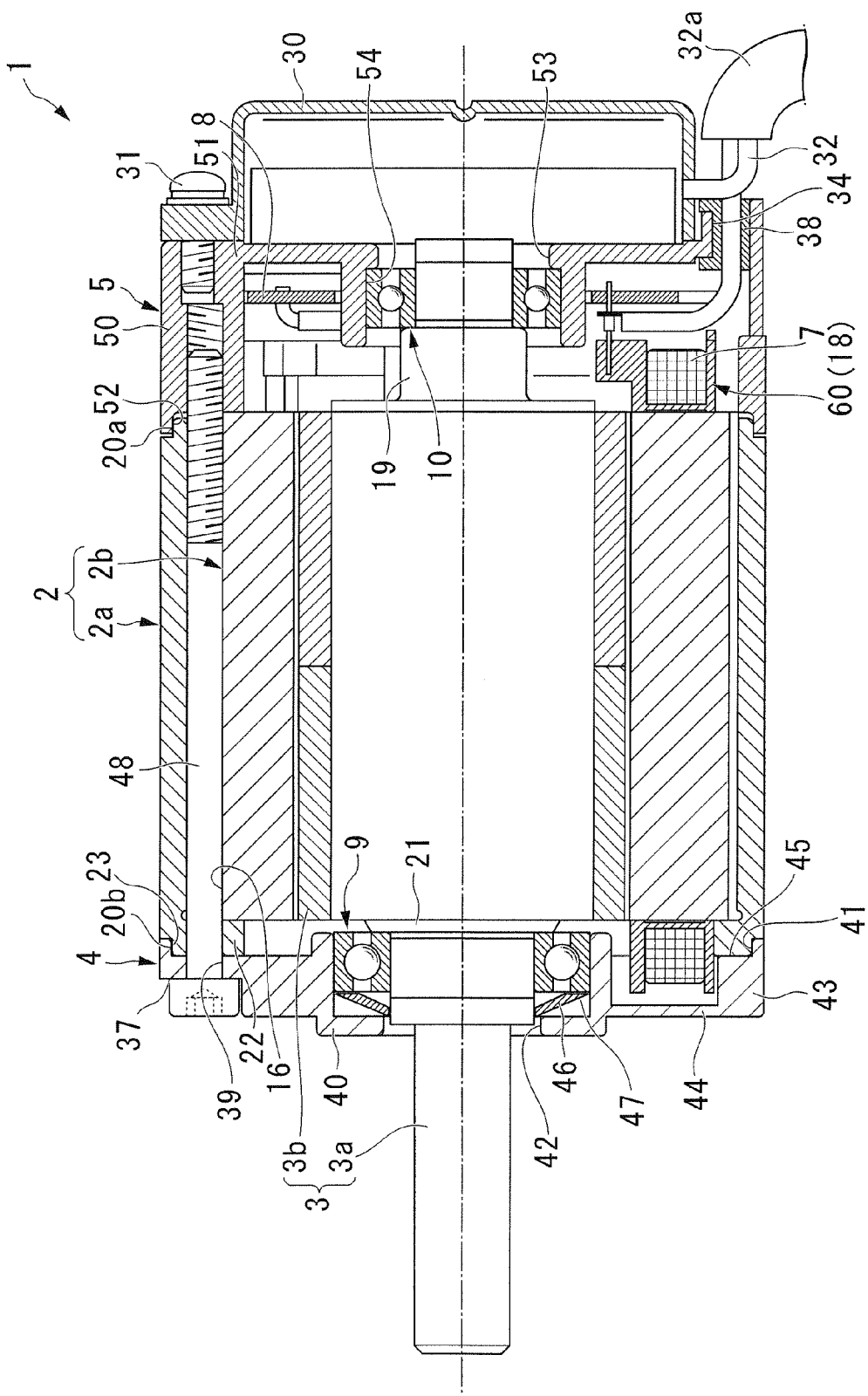
FIG. 1 is a sectional view of a brushless motor of an embodiment of the invention.

In the following description, the left side of FIG. 1 is defined as the front side (other end side), and the right side of FIG. 1 is defined as the rear side (one end side).

Figure 2:
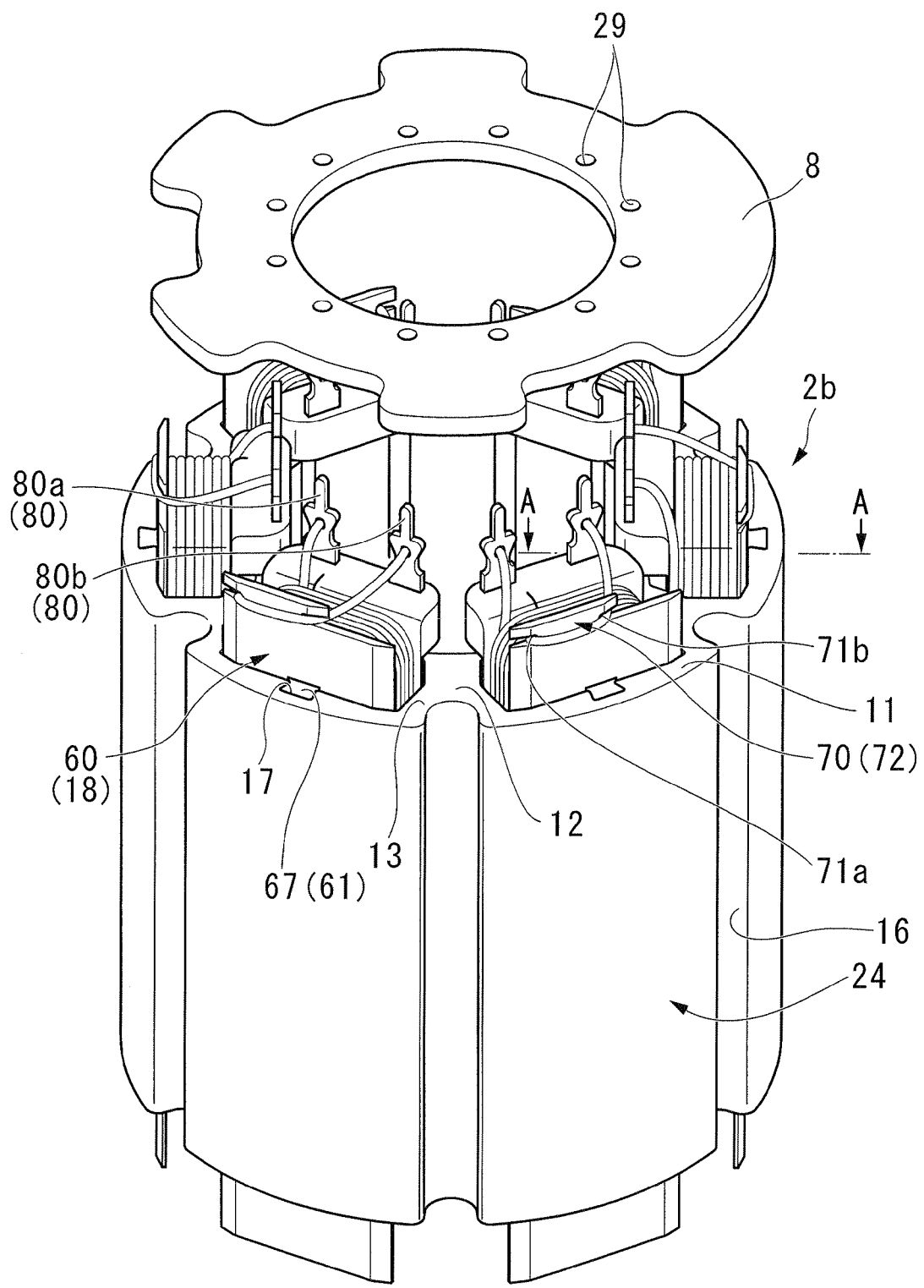
FIG. 2 is an exploded perspective view of a stator core.
Figure 3:
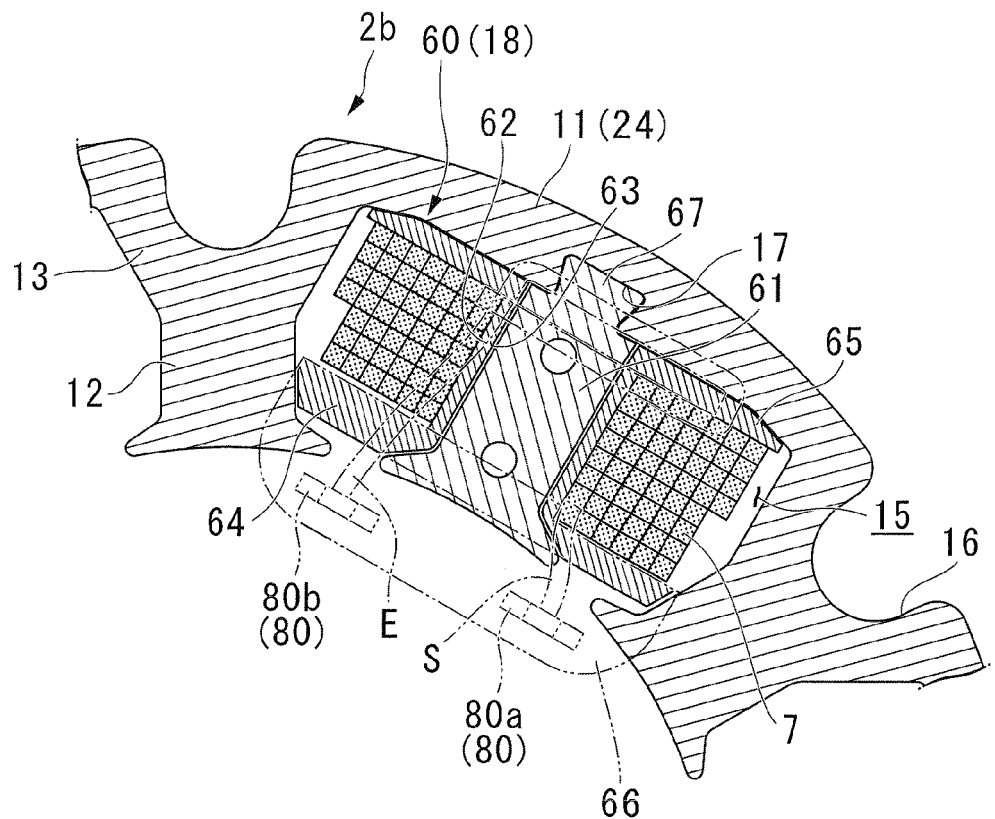
FIG. 3 is a sectional view taken along a line A-A' in FIG. 2.

As shown in FIGS. 1 to 3, a brushless motor 1 of this embodiment is an inner rotor type brushless motor 1, and includes a substantially cylindrical stator 2, and a rotor 3 rotatably provided inside the stator 2.

The stator 2 includes a substantially cylindrical stator case 2a, and a stator core 2b fitted into and fixed to the stator case 2a.

The stator core 2b is formed by laminating a magnetic sheet material axially or pressing magnetic metal powder, and includes a tubular yoke portion 11. At an inner peripheral surface of the yoke portion 11, six commutating-pole teeth 12 which protrude radially inward are integrally formed at equal intervals in the peripheral direction of the yoke portion 11.

Clearance grooves 16 opened axially outward of the stator core 2b at regular intervals in the peripheral direction along the axial direction of the stator core 2b are formed in root portions 13 of the commutating-pole teeth 12. Further, dovetail grooves 17 are formed along the axial direction of the yoke portion 11 at the inner peripheral surface of the yoke portion 11. Each of the dovetail grooves 17 is formed in an intermediate position of the adjacent commutating-pole teeth 12, and is formed so as to be opened into a slot 15 (refer to FIG. 3). A main core 24 is constituted by the yoke portion 11 and the commutating-pole teeth 12.

A split core 18 around which a coil 7 is wound is provided between the adjacent commutating-pole teeth 12. Six split cores 18 are provided at regular intervals in the peripheral direction of the yoke portion 11, and are arranged alternately with the commutating-pole teeth 12.

An opening on the rear side (one end side) of the stator case 2a is formed with a stepped portion 20a whose external diameter is reduced toward an outer peripheral edge, and a rear bracket 5 is provided so as to close an opening on the rear side. The rear bracket 5 is formed in the shape of a tube with a bottom from, for example, aluminum having a high heat transfer rate, and is constituted by a peripheral wall 50 and an end portion (end face) 51.

A stepped portion 52 of the stator case 2a corresponding to the stepped portion 20a is formed at the inner peripheral edge of the peripheral wall 50 of the rear bracket 5, and the stepped portion 52 is fitted onto and fixed to the stepped portion 20a of the stator case 2a. The axial center of the end portion 51 is formed with an insertion hole 53 for allowing one end of the rotor 3 to be inserted therethrough.

In the rotor 3, a substantially cylindrical magnet 3b is fitted onto and fixed to the shaft 3a having stepped portions 19 and 21 at both ends thereof. The magnet 3b is magnetized such that its pole may alternately change in the peripheral direction.

A bearing housing 54 is formed axially inside the insertion hole 53, and a bearing 10 which rotatably supports the shaft 3a is press-fitted into the bearing housing. The bearing 10 is press-fitted such that an end face at an outer ring thereof is butted against the end portion 51 of the rear bracket 5, and is press-fitted such that an end face at an inner ring thereof is butted against the stepped portion 19 at one end of the shaft 3a.

Three set bolt holes 25 through which set bolts 48 are inserted are formed at regular intervals along the peripheral direction axially inside the rear bracket 5. Meanwhile, a cover 30 is fastened and fixed to the axial outside of the rear bracket 5 with bolts 31. The cover 30 closes the end of the rotor 3 at the rear bracket 5, and an optical encoder fixed to this end. The optical encoder detects the rotation angle of the rotor 3. A rotor position detecting method of the brushless motor 1 in this embodiment is not limited to the optical encoder, but may be carried out by a magnetic encoder, a resolver, a Hall IC, and a sensor magnet, and may be carried out by sensor-less driving.

Meanwhile, in the opening on the front side (the other end side) of the stator case 2a, a stepped portion 20b whose external diameter is reduced toward the outer peripheral side similarly to the rear side is formed, and an inner flange portion 22 extended axially inward from the stepped portion 20b is formed. The inner flange portion 22 abuts on the stator core 2b on the reverse face thereof. Further, set bolt holes 23 are formed in the inner flange portion 22 in correspondence with the clearance grooves 16 of the above-described stator core 2b.

Further, a bearing 9 which rotatably supports the shaft 3a is provided on the front side of the shaft 3a. The bearing 9 is press-fitted such that an end face at an inner ring thereof is butted against the stepped portion 21 at the other end of the shaft 3a.

A front bracket 4 is provided on the front side of the stator case 2a so as to close an opening on the front side. The front bracket 4 is formed in the shape of a tube with a bottom from, for example, aluminum having a high heat transfer rate, and is constituted by a peripheral wall 43 and a bottom plate 44.

The peripheral wall 43 of the front bracket 4 is thickly formed at the inside of the stator case 2a, and its end face is formed as a face 45 which butts against the inner flange portion 22 of the stator case 2a. Here, the butting face 45 is formed in the same shape as the width of the inner flange portion 22. A stepped portion 41 corresponding to the stepped portion 20b is formed at the outer peripheral side of the peripheral wall 43. As the stepped portion 41 is fitted onto the stepped portion 20b of the stator case 2a, the front bracket 4 is fixed such that the butting face 45 and the inner flange portion 22 are fixed so as to abut on each other face to face.

A boss 40 is formed axially outward at the axial center of the front bracket 4. An insertion hole 42 for allowing the other end side of the shaft 3a to be inserted therethrough is formed at the axial center of the boss 40, and the axial inside of the insertion hole 42 is formed as a bearing housing 47 in which a wave washer 46 is accommodated. Also, the other end side of the shaft 3a is inserted through the insertion hole 42 such that the bearing 9 press-fitted into the shaft 3a is accommodated in the bearing housing 47 via the wave washer 46. The wave washer 46 presses an outer ring of the bearing 9 to give a force in a thrust direction to the inner ring via balls. Three clearance portions 37 which are cut out at the axial direction at regular intervals in the peripheral direction are formed at a peripheral edge of the front bracket 4, and set bolt holes 39 are formed in correspondence with the above-described set bolt holes 23 and the clearance grooves 16.

Also, the front bracket 4 and the stator 2, and the rear bracket 5 are connected by inserting and fastening the set bolts 48 from the set bolt holes 39. Heads of the set bolts 48 are accommodated in the clearance portions 37, and thereby become flush with the bottom plate 44 of the front bracket 4.

Figure 4:
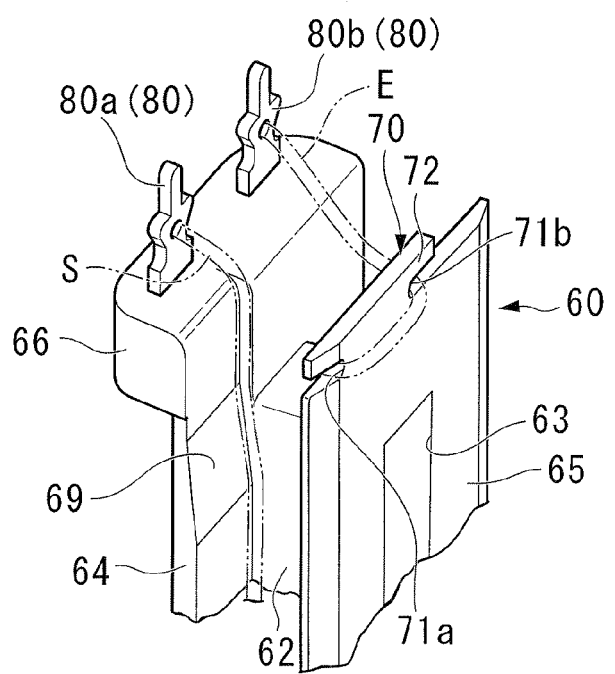
FIG. 4 is a partially perspective view of a coil bobbin.

As shown in FIGS. 2 to 4, the above-described split core 18 includes a coil bobbin 60 around which the coil 7 is wound, and a split tooth 61 which is mounted on the coil bobbin 60.

The coil bobbin 60 is made of a material having an insulating property, such as resin, and includes a rectangular tubular winding portion 62 (refer to FIG. 4) around which the coil 7 is wound. A central portion of the coil bobbin 60 is formed with a rectangular mounting hole 63 which passes through the coil bobbin 60 in its width direction (the radial direction of the stator core 2b), and this central portion is mounted with the split tooth 61. As the coil 7 in this embodiment, an angled one in which the surface of a copper wire covered with an insulating film is covered with an adhesive film is used.

Both peripheral edges of the winding portion 62 has an inner flange portion 64 and an outer flange portion 65 which extend outward.

One end side of the inner flange portion 64 formed inside the coil bobbin 62 is formed as an enlarged portion 66 which extends axially inward, and the tip of the inner flange portion is provided with a pair of terminals 80.

One of the terminals 80 is a terminal 80a of a winding starting end of the coil 7, and the other thereof is a terminal

80b of a winding finishing end of the coil 7, and the coil 7 wound around the coil bobbin 60 is connected to the terminals.

An holding portion 70 is formed at the terminal 80a of the winding starting end in a reverse face of the outer flange portion 65 of the coil bobbin 62. As for the holding portion 70, an extending portion 72 that extends upward (upward in FIG. 4) from the outer flange portion 65 is formed integrally, and cutout portions 71a and 71b obtained by cutting out both sides of the extending portion 72 inward are formed. The winding finishing portion of the coil 7 wound around the winding portion 62 is wound around the holding portion 70 and is connected to the terminal 80b of the winding finishing end.

An inclined portion 69 is formed at the terminal 80a of the winding starting end in a reverse face of the inner flange portion 64 of the coil bobbin 60. The inclined portion 69 is formed in the shape of a slope to a halfway portion of the inner flange portion 64 along the longitudinal direction from the tip of the enlarged portion 66. Specifically, the inclined portion is preferably inclined as much as the thickness of one turn of the coil 7.

The split tooth 61 is a member which is a T-shaped in plan view, and one end thereof is formed with a projection 67 which can fit into the dovetail groove 17 of the main core 24. Then, after the mounting hole 63 of the coil bobbin 60 is mounted with the split tooth 61, the projection 67 of the split tooth 61 and the dovetail groove 17 of the main core 24 are made to fit to each other.

Here, when the split core 18 is made to fit to the main core 24, the enlarged member 66 formed in the inner flange portion 64 of the coil bobbin 60 is arranged so as to overlap the tip of the split tooth 61.

Specifically, the enlarged member is installed at the internal diameter side of the stator core 2b so as to extend more inward than the tip of the split tooth 61 and face the inside of the stator core 2b. Accordingly, each of the terminals 80a and 80b provided in the enlarged member 66 is also arranged in a space at the internal diameter side of stator core 2b.

A substantially disc-like wiring substrate 8 is joined to each of the terminals 80a and 80b. The wiring substrate 8 supplies external power to the coil 7, and is accommodated at the inner peripheral side of the peripheral wall 50 of the rear bracket 5 and at the outer peripheral side of the bearing housing 54. A plurality of through-holes 29 are formed in the peripheral direction at the internal diameter side of the wiring substrate 8 (refer to FIG. 2). The terminals 80a and 80b in which the winding starting end and winding finishing end of the coil 7 are connected, respectively, are inserted through the through-holes 29, respectively, and are joined by soldering.

An external power source (not shown) and a plurality of lead wires 32 are joined to the wiring substrate 8, and the coil 7 wound around the split core 18 is electrically connected via a land or pattern (not shown) which is formed in the wiring substrate 8. The lead wires 32 are drawn out along the axial direction, and the lead wires are drawn out via a grommet 38 from a drawn-out hole 34 which is formed in a lower portion of the rear bracket 5, and are connected to an external power source. Reference numeral 32a in FIG. 1 is a covering tube which bundles and covers the lead wires 32.

Here, a method of winding of the coil 7 in the brushless motor 1 of this embodiment will be described.

First, as shown in FIG. 4, the coil 7 is wound around the coil bobbin 60. Specifically, the coil 7 is connected to the terminal 80a of the winding starting end, and is wound around the winding portion 62. Here, the coil 7 drawn around from the terminal 80a is different from the coil 7 wound around the winding portion 62 in directivity. However, by allowing one turn of the coil 7 drawn around from the terminal 80a to clearance to the inclined portion 69, overlapping coils 7 do not interfere with each other (refer to chain lines S in FIGS. 3 and 4).

Here, after the winding finishing portion of the coil 7 wound around the winding portion 62 is turned around the outside of the coil bobbin 60 from the cutout portion 71a of the holding portion 70 formed in the outer flange portion 65 and is wound around the cutout portion 71b, it is stretched while tension is maintained at the terminal 80b of the finishing end formed in the inner flange portion 64 (refer to chain lines E in FIGS. 3 and 4).

The coil 7 of this embodiment is covered with an adhesive film, and the coil 7 can be firmly secured by self-welding of this adhesive film. As a welding method, the coil 7 may be wound around the coil bobbin 60 while hot air is applied to the coil to weld the coil, or an electric current may be caused to flow through the coil 7 to weld the coil generated by the current. Further, the coil 7 may be collectively welded after winding.

As such, according to the above-mentioned embodiment, a pair of terminals 80a and 80b is formed such that both are arranged inside the internal diameter of the stator core 2b inside the winding portion 62 of the coil bobbin 60. Thus, the through-holes 29 of the wiring substrate 8 can be formed inside. That is, by effectively using the space formed inside the stator core 2b, it is not necessary to provide through-holes on the external diameter side of the wiring substrate 8 unlike the related art. That is, it is not necessary to make the external diameter of the wiring substrate 8 larger than needed, and the wall thickness of the yoke portion 11 of the main core 24 can be made small. Therefore, the space of the slot 15 formed between the adjacent commutating-pole teeth 12 can be largely secured.

Accordingly, since the occupancy of the coil 7 can be improved, loss can be reduced, and motor torque can be enhanced. On the other hand, since the space of the slot 15 can be largely secured, the brushless motor 1 can also be made small and lightweight while the occupancy of the coil 7 is maintained.

Moreover, since the holding portion 70 is formed in the outer flange portion 65 of the coil bobbin 60, the winding finishing portion of the coil 7 wound around the winding portion 62 is drawn around to the cutout portion 71b from the cutout portion 71a, and is then connected to the terminal 80b of the winding terminal end. Thereby, since the coil 7 can be more firmly wound compared with a case where the winding finishing end of the coil 7 is directly connected to the terminal 80b, loosening of the tension caused by temporal vibration, etc. can be prevented. Accordingly, since disordered winding of the coil 7 can be prevented, loss can be reduced, and short-circuiting between the coil 7 and the split tooth 61 or metal parts, such as the commutating-pole teeth 12, can be prevented.

It should be understood that the invention is not limited to the above-described embodiment, but various modifications may be made to the above-described embodiment without departing from the spirit of the invention. For example, the stator core of this embodiment is constituted by a main core in which commutating-pole teeth are integrally formed with a communicating-pole yoke portion, and split cores including split teeth. However, all the teeth may be attached as the split teeth. Further, the coil may be not an angled coil, but a round coil.

While preferred embodiments of the invention have been described and illustrated above and it should be understood that these are exemplary of the invention and are not to be considered as limiting. Additions, omissions and substitutions, and other modifications can be made without departing from the spirit or scope of the present invention. Accordingly, the invention is not to be considered as being limited by the foregoing description, and is only limited by the scope of the appended claims.

What is claimed is:

1. A brushless motor comprising
   a tubular stator case;
   a stator core fitted into the stator case;
   a rotor rotatably supported via a bearing inside the stator core;
   a plurality of teeth which extend inward in radial directions of the stator core and are integrally formed on an inner peripheral surface of the stator core at regular intervals in the peripheral direction of the stator core;
   a coil bobbin mounted between the mutually adjacent teeth, which has a winding portion around which a coil is wound;
   a lead wire which feeds power to the coil; and
   a wiring substrate which relays a connection between the lead wire and the coil, wherein:
   the coil bobbin has flange portions which protrude outward from peripheral edges of the both ends of the coil bobbin;
   one of the flange portions which is located on the inward in the radial direction has an enlarged portion which protrudes outward from the surface of the flange portion;
   a pair of terminals which is connected to the wiring substrate is provided on the enlarged portion so as to be located more inward than a tip of the tooth in the radial direction.

2. The brushless motor according to claim 1, wherein the other of the flange portions which is located on the outward side in the radial direction has a holding portion which holds the coil wound to one end of the coil bobbin and guides the end of the coil to one of the terminals.

* * * * *